US00RE45657E

(19) United States
(12) Reissued Patent
Cho

(10) Patent Number: US RE45,657 E
(45) Date of Reissued Patent: Aug. 25, 2015

(54) SKIN CARE MASSAGE TOOL

(71) Applicant: AMOREPACIFIC CORPORATION, Seoul (KR)

(72) Inventor: Eun Ha Cho, Gyeonggi-do (KR)

(73) Assignee: Amorepacific Corporation, Seoul (KR)

(21) Appl. No.: 29/463,941

(22) Filed: Mar. 20, 2014

Related U.S. Patent Documents

Reissue of:
(64) Patent No.: Des. 684,702
Issued: Jun. 18, 2013
Appl. No.: 29/439,195
Filed: Dec. 7, 2012

(30) Foreign Application Priority Data

Jun. 22, 2012 (KR) ..... 30-2012-0030604

(51) LOC (10) Cl. ..... 28-03
(52) U.S. Cl.
USPC ..... D24/215
(58) Field of Classification Search
USPC ..... D24/200, 211, 212, 213, 214, 215; 601/114, 120, 121, 124, 125, 130, 131, 601/134, 135, 136, 137; D28/259
See application file for complete search history.

(56) References Cited

U.S. PATENT DOCUMENTS

| | | | | | |
|---|---|---|---|---|---|
| 4,590,926 | A | * | 5/1986 | Courtin | 601/137 |
| 4,892,091 | A | * | 1/1990 | Sullenger | 601/137 |
| D336,548 | S | * | 6/1993 | Zeller | D29/121.1 |
| D375,167 | S | * | 10/1996 | Taylor | D24/214 |
| D386,879 | S | * | 11/1997 | Daniels | D24/214 |
| D469,878 | S | * | 2/2003 | Davis et al. | D24/206 |
| D472,321 | S | * | 3/2003 | Davis et al. | D24/206 |
| D524,445 | S | * | 7/2006 | Liang | D24/214 |
| D526,720 | S | * | 8/2006 | Dodo et al. | D24/206 |
| D526,721 | S | * | 8/2006 | Dodo et al. | D24/206 |
| D526,722 | S | * | 8/2006 | Dodo et al. | D24/206 |
| D527,829 | S | * | 9/2006 | Dodo et al. | D24/206 |
| D572,829 | S | * | 7/2008 | Reed et al. | D24/206 |
| D615,210 | S | * | 5/2010 | Woodhams et al. | D24/211 |
| D666,734 | S | * | 9/2012 | Takashima | D24/215 |
| D677,394 | S | * | 3/2013 | Grust et al. | D24/215 |

* cited by examiner

*Primary Examiner* — Phillip S Hyder
(74) *Attorney, Agent, or Firm* — Ohlandt, Greeley, Ruggiero & Perle, L.L.P.

(57) CLAIM

The ornamental design for a skin care massage tool, as shown and described.

DESCRIPTION

FIG. 1 is a perspective view of the skin care massage tool of the present invention;
FIG. 2 is a front elevation view of the skin care massage tool shown in FIG. 1;
FIG. 3 is a rear elevation view of the skin care massage tool shown in FIG. 1;
FIG. 4 is a left side elevation view of the skin care massage tool shown in FIG. 1;
FIG. 5 is a right side elevation view of the skin care massage tool shown in FIG. 1;
FIG. 6 is a top plan view of the skin care massage tool shown in FIG. 1; and,
FIG. 7 is a bottom plan view of the skin care massage tool shown in FIG. 1.
*The broken lines define an area of the skin care massage tool that is not considered part of the claimed design.*

1 Claim, 7 Drawing Sheets

Figure 1:
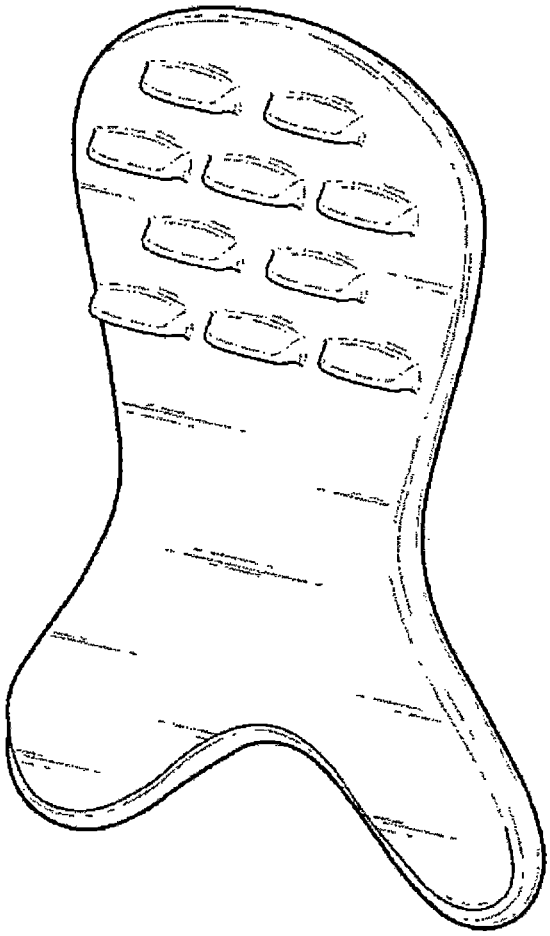
Figure 2:
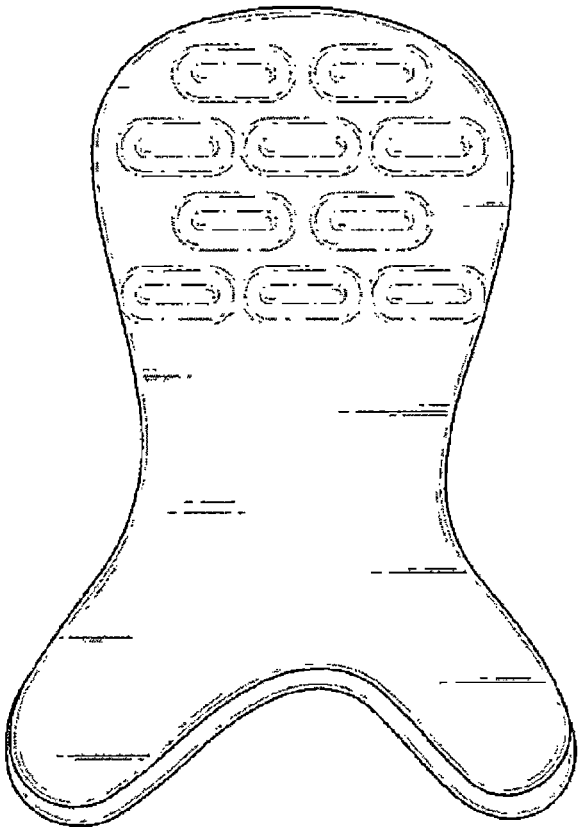
Figure 6:
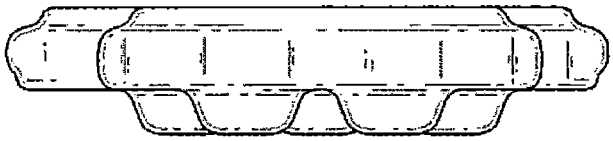
Figure 7:
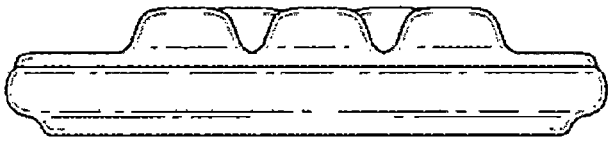

Matter enclosed in heavy brackets [ ] appears in the original patent but forms no part of this reissue; matter printed in italics indicates the additions made by reissue.

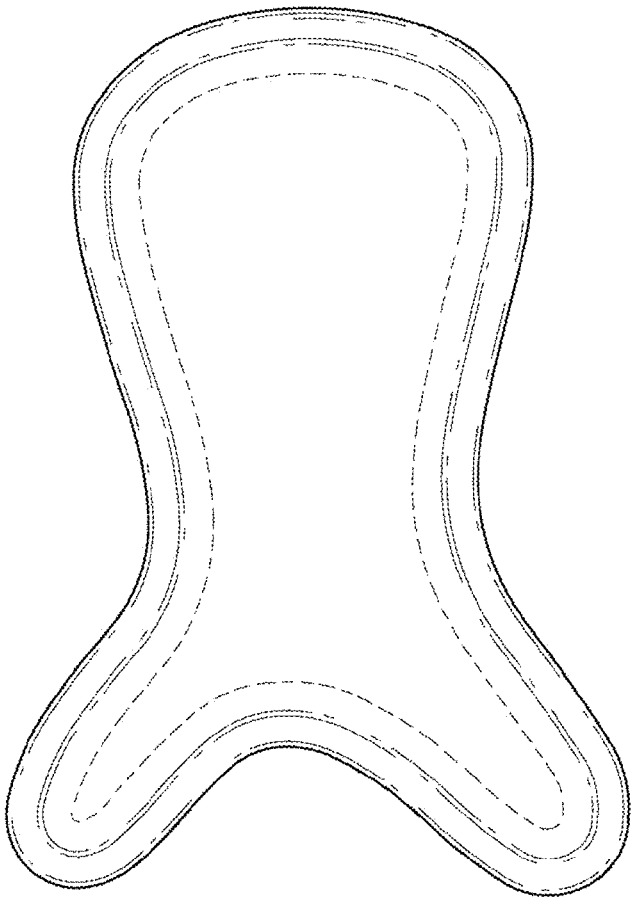
Fig. 3
AMENDED

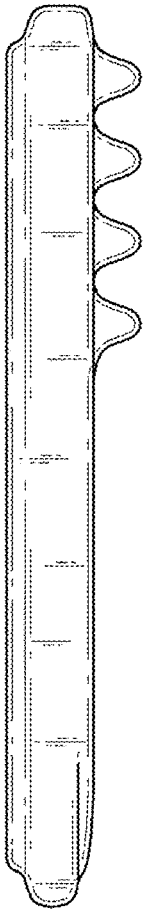
Fig. 4
AMENDED

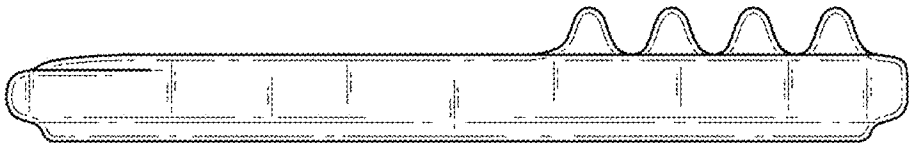
Fig. 5
AMENDED